United States Patent
Edwards (10) Patent No.: US 8,823,579 B2
(45) Date of Patent: Sep. 2, 2014

(54) SENSOR FOR DETERMINING VELOCITY

(75) Inventor: Philip Trevelyan Edwards, Hampshire (GB)

(73) Assignee: BAE Systems PLC, London (GB)

(*) Notice: Subject to any disclaimer, the term of this patent is extended or adjusted under 35 U.S.C. 154(b) by 314 days.

(21) Appl. No.: 13/255,732

(22) PCT Filed: Mar. 9, 2010

(86) PCT No.: PCT/GB2010/050397
§ 371 (c)(1),
(2), (4) Date: Sep. 9, 2011

(87) PCT Pub. No.: WO2010/103309
PCT Pub. Date: Sep. 16, 2010

(65) Prior Publication Data
US 2012/0001790 A1   Jan. 5, 2012

(30) Foreign Application Priority Data

Mar. 11, 2009 (EP) ................................. 09250680
Mar. 11, 2009 (GB) ................................. 0904149.2

(51) Int. Cl.
*G01S 13/08* (2006.01)
*G01S 7/41* (2006.01)
*G01S 13/524* (2006.01)

(52) U.S. Cl.
CPC .............. *G01S 7/415* (2013.01); *G01S 13/5246* (2013.01)
USPC ............................. 342/104; 342/115; 342/93

(58) Field of Classification Search
CPC .............. G01S 7/2927; G01S 13/5246; G01S 13/5244; G01S 13/526
USPC ........................................ 342/91–93, 104, 160
See application file for complete search history.

(56) References Cited

U.S. PATENT DOCUMENTS 3,727,224 A * 4/1973 Webb .............................. 342/161
3,962,704 A * 6/1976 Evans ............................. 342/162
(Continued)

FOREIGN PATENT DOCUMENTS

EP            0 069 415      1/1983
WO    WO 2009/027718 A1     3/2009

OTHER PUBLICATIONS

International Preliminary Report on Patentability from related International Application No. PCT/GB2010/050397, dated Sep. 22, 2011.

(Continued)

*Primary Examiner* — John B Sotomayor
*Assistant Examiner* — Marcus Windrich
(74) *Attorney, Agent, or Firm* — Scully, Scott, Murphy & Presser, P.C.

(57) ABSTRACT

There is provided a sensor for use generally within the signal processing unit of a radar system. The sensor enables entity returns to be classified according to the velocity of the entity and thus allows returns to be processed according to classification. In particular, the sensor comprises a first processing means that filters an input signal using a narrow-band notch filter to output a wideband output. In particular, the sensor comprises a second processing means that filters an input signal using a wide-band notch filter to output a narrowband output. The invention provides for the comparison of the outputs to determine how the entity return is to be classified.

15 Claims, 4 Drawing Sheets

(56) References Cited

U.S. PATENT DOCUMENTS

| | | | |
|---|---|---|---|
| 4,035,800 A | | 7/1977 | Lewis et al. |
| 4,067,013 A | | 1/1978 | Smith |
| 4,119,966 A | * | 10/1978 | Bouvier et al. ............... 342/90 |
| 4,210,911 A | * | 7/1980 | Jacomini ..................... 342/149 |
| 4,275,396 A | | 6/1981 | Jacomini |
| 4,335,383 A | * | 6/1982 | Berry .......................... 342/115 |
| 4,688,044 A | | 8/1987 | O'Brien |
| 5,357,256 A | * | 10/1994 | Peperone ..................... 342/160 |
| 5,485,157 A | * | 1/1996 | Long ........................... 342/160 |
| 5,644,315 A | * | 7/1997 | Long ............................ 342/93 |
| 5,781,149 A | * | 7/1998 | Long ........................... 342/160 |
| 6,350,806 B1 | * | 2/2002 | Tsuda et al. ................. 524/492 |
| 6,361,865 B1 | * | 3/2002 | Tsuda et al. ................. 428/412 |
| 6,765,525 B2 | * | 7/2004 | Bickert et al. ............... 342/160 |
| 6,800,679 B2 | * | 10/2004 | Wada et al. .................. 524/148 |
| 7,286,079 B2 | * | 10/2007 | Blunt et al. .................. 342/159 |
| 2004/0019145 A1 | * | 1/2004 | Imoto et al. ................. 524/502 |
| 2006/0049978 A1 | * | 3/2006 | Siegel .......................... 342/159 |
| 2010/0158152 A1 | * | 6/2010 | Edwards ....................... 375/285 |

OTHER PUBLICATIONS

International Search Report dated Apr. 26, 2010 issued in PCT/GB2010/050397.
European Search Report dated Sep. 4, 2009 issued in EP 09 25 0680.
UK Search Report dated Jun. 30, 2009 issued in GB 0904149.2.

* cited by examiner

SENSOR FOR DETERMINING VELOCITY

The following invention relates to a sensor and method for determining whether a received signal has been returned either from an object moving at or above a threshold velocity or from a lesser velocity object. In particular, the invention may be implemented within a radar system and so the invention further relates to a radar system incorporating the sensor.

It is well known in ranging and detection systems, such as radar, that a signal transmitted to detect a target may be returned by another object. Signals, known as "clutter", returned by an object other than the target are generally undesirable for various reasons.

Firstly, clutter can make returns from the target less likely to be detected and as such may prevent the target from being detected.

Secondly, clutter can be falsely interpreted by a radar system as being a return from a target. For convenience, signals returned from targets may henceforth be referred to as target returns. Further, throughout this specification "False Alarm" is the term used to refer to the situation where clutter is processed by the radar system as if it were a target return. In general a False Alarm may also be caused by electromagnetic interference, background radiation or receiver noise but it is False Alarms caused by clutter that this invention is particularly concerned with.

False Alarms are undesirable because a radar system has a finite amount of resources, such as processing power and time, with which to perform various operations. This scarcity is exacerbated in radar systems that have an electronically scanned antenna (such as a phased array) which performs both scanning and tracking operations and so must share the resources appropriately between scanning and tracking operations. Further, this scarcity is exacerbated where the radar is intended to track and monitor high velocity targets.

For example, in many radar systems, the detection of a return from a target will automatically initiate a tracking operation such as "dwell", which is an increase in the time spent in a certain beam direction so as to transmit further pulses to the relevant range cell or cells. However, in many radar systems, a False Alarm would also lead to such an operation. Thus, the processing of clutter as if it were a target return depletes the resource available for use in operations which may genuinely deserve more resource. Thus False Alarms inhibit the capability of the radar system.

To reduce the likelihood of clutter being interpreted as a target return, sensors such as Moving Target Indicator processors (MTIs) may be implemented in the signal processing logic of radar systems.

Various MTIs are known and these tend to work by assuming firstly that the velocity of the target is substantially above zero and secondly that the velocity of the object returning the clutter, which may henceforth be referred to as the lesser velocity object, is at or near zero. The target returns may hence be distinguished from the clutter based upon the relative Doppler shifts of the respective returned signals. Consequently an MTI typically employs a single band stop filter tuned to attenuate any returns at frequencies corresponding to near-zero velocities and zero velocities. Such filters may be commonly referred to as 'Doppler Filters'.

In applications where the velocities of the lesser velocity objects are close to zero, the use of a single MTI comprising a single band-stop filter may be sufficient; the majority of clutter is often from static objects such as mountains, or near-zero velocity objects such as clouds, and such clutter may be safely discarded.

However, clutter may also be returned by a particular class of lesser velocity objects, which class may henceforth be referred to as intermediate velocity objects, that have a velocity sufficiently greater than zero (so that returns are not discarded by a typical MTI) but less than the likely velocity of a target that ought to be tracked.

Intermediate velocity objects can be falsely interpreted by the radar system as targets and consequently the associated returns can inappropriately consume radar resources.

Whilst it may be possible to tune the band stop filter to discard signals returned by intermediate velocity objects, or to use a plurality of filters to achieve the same effect, such a processing strategy may be disadvantageous because, generally, as more signal is discarded, the chance of failing to detect a valid target increases.

Given that it is undesirable to discard intermediate velocity object returns, validly distinguishing between a target and an intermediate velocity object becomes even less likely if the intermediate velocity object has a similar radar cross section (RCS) when compared to a target entity RCS.

Known radar thresholding techniques (e.g. comparing the strength of a return from a cell under inspection to the average strength of the return from reference cells surrounding the cell under inspection) are not suited to finding a target in the midst of a set of intermediate velocity objects if both the target and the lesser velocity object have similar RCSs. Thus it can be appreciated that if the intermediate velocity object returns cannot be distinguished from the target returns by either the MTI or the radar thresholding processor, then returns from intermediate velocity objects can be particularly difficult to manage in a radar system.

Thus, it is an object of the present invention to provide an apparatus and method that can tend to mitigate at least one of the above mentioned disadvantages of MTIs and thresholding techniques. In particular, the apparatus and method of the invention aims to provide an improved way of detecting a target in the midst of intermediate velocity objects, the target entity and intermediate velocity objects having similar RCSs.

According to a first aspect of the invention there is provided a sensor for detecting whether a received signal has been returned either from an object moving at or above a threshold velocity or from an object moving at a lesser velocity, the sensor comprising: a) a first processing means comprising a narrow-band notch filter, the processing means being configured to receive an input signal derived from the received signal and generate a wide-band output; b) a second processing means comprising a wide-band notch filter, the processing means being configured to receive the input signal and generate a narrow-band output; c) a comparator configured to receive: i) the narrow-band output and ii) the wide-band output, wherein the comparator may generate a flag signal for indicating the presence of an object moving at a lesser velocity if the narrow-band output is determined to be less than the wide-band output.

An advantage of this invention is that it can be readily implemented on existing sensors, such as a signal processing means in a radar system, by adding and suitably connecting the second processing means and the comparator.

A further advantage is that the sensor is able to provide two outputs, firstly an output derived from the narrow-notch filter and secondly the output from the comparator, for further processing in the radar system and in particular in a Post-Detection Processing means of the radar system. Each of these outputs provides information relating to the object that returned the received signal. Beneficially, by providing two outputs for analysis, more information about the velocity of the object and more information about the nature of the object can be inferred. For example, a high velocity object may be presumed to be hostile.

The first and second processing means may be contained in a consolidated processing means such as a microprocessor. Alternatively, processing means may be provided on separate processors.

The comparator may be connected directly to the narrow-band and wide-band filter. Alternatively, the comparator may be connected to the filter via a chain of processing means including, for example, a Constant False Alarm Rate (CFAR) processor.

The sensor may additionally comprise a thresholding filter in operable connection with the narrow notch filter and suitable for operable connection with a post detection processing means, the thresholding filter setting a detection threshold and thereby discarding the output derived from the narrow-band notch filter if the magnitude of the output derived from the narrow-band notch filter is below the detection threshold.

Thus the detection threshold can be calibrated to discard output signals corresponding to zero velocity and near-zero velocity objects. Thus the sensor will tend to discard the majority of the clutter where the majority or clutter tends to have a zero or near-zero velocity, for instance when the majority comes from clouds or other static objects. More specifically, it is the combined operation of the narrow-notch filter (which attenuates returns from low velocity objects) and the detection threshold processor that may be used to tend to provide a clutter-free output. Further, the comparator output (i.e. the flag signal) can indicate whether the clutter free output is likely to contain returns from an intermediate velocity object.

By operably connecting the threshold filter to the post detection processing means of the radar system, and thus passing the output from the thresholding filter to the post-detection processing means, the processing resources of the post-detection processing means will not be expended analyzing such clutter. Thus the output derived from the narrow-notch filter can be processed by the radar system to minimize the use of processing resources because the majority of the clutter is removed and so cannot in itself lead to false alarms.

The thresholding filter may be within the first processing means or may be on a separate processing means altogether. The operable connection between the narrow notch filter and the thresholding filter may be a direct connection, that is to say the output of the narrow-notch filter is input to the thresholding filter, or may be via intermediate processing means.

The determination as to whether the narrow-band output is less than the wide-band output may be made by comparing the gains or attenuations of the outputs against each other or certain further criteria.

Determinations as to whether the narrow-band output is less than the wide-band output may in particular seek to determine whether the narrow-band output is substantially less than the wide-band output. Where the determinations are such, the further criteria may require the establishment of pre-determined gain thresholds or threshold ratios.

In some embodiments the comparator may be operably connected to the thresholding filter, so that the comparator determines that the narrow-band output is less than the wide-band output if: (i) the narrow-band output is less than the detection threshold, and the wide-band output is greater than the detection threshold or alternatively if (ii) the wide-band output divided by the narrow-band output exceeds a threshold ratio.

More specifically, the comparator may be configured to receive from the threshold filter the detection threshold.

As such the comparator generates the flag signal according to the relative attenuation of the wide-band and narrow-band outputs. Moreover, by suitably calibrating the threshold ratio and the detection threshold, the flag signal can indicate the presence of an intermediate velocity object, which object is defined as having a velocity greater than the near-zero velocities where the majority of clutter tends to occur but not great enough to be a likely target. In practice it is preferred that the near-zero velocity band has an upper limit of 10 m/s.

Recalling the effect of the thresholding filter, it will be appreciated that the output from the threshold filter may contain clutter from an intermediate velocity object or may contain target returns. As such it is possible and advantageous in the present invention to process the threshold filter output in a variety of different ways according to the flag signal.

For example, if the flag signal indicates the presence of an intermediate velocity object in a certain range cell, then the radar system can discard the threshold filter output associated with that range cell as being a clutter return. However, if there is sufficient processing resource available, the radar system can choose to monitor the range cell. Advantageously this allows the radar system to effectively prioritise monitoring operations and thus use processing power efficiently.

A particular application of the sensor would be in the detection of objects that have lower velocities than target and are not generally deemed to present a threat but may be worth monitoring in certain situations. An example of such an intermediate velocity object would be a bird or a flock of birds.

The narrow-band notch filter may have a one-sided bandwidth that is less than the frequency of the signal corresponding to the threshold velocity and the wide-band notch filter has a one-sided bandwidth greater than or equal to the frequency of the signal corresponding to the threshold velocity.

This calibration of bandwidths results in the narrow-band output being less than the detection threshold and the wide-band output being greater than the detection threshold if a received signal is returned by an object or target travelling at a velocity greater than the threshold velocity.

For detecting birds, it is preferable that the narrow-band notch filter is tuned for filtering out signals corresponding to zero or near zero velocity objects and the wide-band notch filter is tuned for filtering out signals from objects with velocities less than 25 m/s.

25 m/s is chosen because it is considered to be the maximum velocity of a bird accounting for typical wind speeds. That is to say, 25 m/s is the upper limit of the intermediate velocity object and hence may represent the threshold velocity.

It follows that a radar system using such a sensor can ignore returns from objects travelling at velocities greater than 'near-zero' but less than 25 m/s on the grounds that the returns are likely to be avian clutter or from other objects that are not desired to be detected. However, a radar system using this sensor allows such returns to be processed in a manner appropriate for birds.

It can be appreciated that, where the sensor is for detecting birds, intermediate velocity objects may be defined as the objects with a velocity of between 10-25 m/s. In which case, and where the sensor operates in the L band (1.3 GHz RF), the one-sided band pass frequency of the narrow notch filter will be 87 Hz and the one-sided band pass frequency of the wide notch filter will be 217 Hz. Alternatively, where the sensor operates in the S band (3 GHz RF), the one-sided band pass frequency of the narrow notch filter may be 200 Hz and the one-sided band pass frequency of the wide notch filter may be 500 Hz. Alternatively, where the sensor operates in the C band (5.5 GHz RF), the one-sided band pass frequency of the narrow notch filter may be 367 Hz and the one-sided band pass frequency of the wide notch filter may be 917 Hz. Alternatively, where the sensor operates in the X band (9.5 GHz RF), the one-sided band pass frequency of the narrow notch filter may be 634 Hz and the one-sided band pass frequency of the wide notch filter may be 1584 Hz.

A further application of the invention would be where the radar is used to monitor an area of land as opposed to a predominantly airborne volume. In such a context, the radar system may have the priority of surveying and tracking high velocity targets (so as to give weapons systems associated with the radar more time to react), but may also be required to survey and track lower velocity objects.

Depending on the context, within each of the first and second processing means, further signal processing operations may be performed on the input signal downstream of the filter. Thus further signal processing means associated with the further processing operations may interconnect the narrow-band filter or wide-band filter to the comparator. It is preferable that the first processing means further comprises a Take Log of Modulus processing means and the second processing means further comprises a Take Log of Modulus processing means such that a signal is equivalently manipulated by each Take Log of Modulus processing means. In further preference, the first processing means further comprises a CFAR processing means and the second processing means further comprises a CFAR processing means such that a signal is equivalently manipulated by each CFAR processing means. In still further preference, the first processing means further comprises a non-coherent integrator processing means and the second processing means further comprises a non-coherent integrator processing means such that a signal is equivalently manipulated by each non-coherent integrator processing means.

By equivalently manipulating the signals, e.g. with the same transfer function, distinctions between the outputs from the processing means should tend to be a result of the different filters only.

In the majority of applications, the received signal will comprise a plurality of coherent pulses and so it is preferred that the sensor is adapted to receive and process a received signal comprising a plurality of coherent pulses.

According to another aspect of the invention there is provided a method for determining whether a received signal has been returned either from an object moving at or above a threshold velocity, or from an object moving at a lesser velocity, the method being for use in a radar system and comprising the steps of: i deriving an input signal from a received signal ii filtering the input signal at a first processing means, using a narrow-band notch filter, to obtain a wide-band output, iii filtering the input signal at a second processing means, using a wide-band notch filter, to obtain a narrow-band output iv comparing the wide-band output to the narrow-band output such that if the narrow-band output is determined to be less than the wide-band output, a flag signal is generated to indicate that the received signal is from an object moving at a lesser velocity.

According to yet another aspect of the invention there is provided a radar system for detecting whether a received signal has been returned either from an object moving at or above a threshold velocity or from an object moving at a lesser velocity, the radar system comprising a sensor according to the first aspect of the invention, and further comprising a post detection processing means operably connected to the sensor.

The incorporation of a post detection processing means enables the radar system to appropriately survey or track according to the sensor outputs. This helps to make efficient use of the radar resources available.

The radar system may associate the flag signal with a particular range cell within a volume under surveillance.

As such the system facilitates the distinguishing of returns according to position and as such tends to improve the radar system's ability to identify a target in close proximity to an intermediate velocity object.

If the sensor inputs a null flag signal to the post detection processing means, then the post detection processing means may output a signal permitting the radar system to track the target identified in the associated range cell and if the sensor outputs a flag signal to the post detection processing means, the post detection processing means can output a signal inhibiting the radar system from tracking the entity identified in the associated range cell.

The inhibiting of the radar system from tracking the object identified in the associated range cell may vary with the contemporaneous availability of a processing power in the radar system.

In this way the resources, and in particular the processing power of the radar system will tend to be preserved for the tracking operations which, by virtue of the target velocity, require more processing power.

It will of course be appreciated that features described in relation to one aspect of the present invention may be incorporated into other aspects of the present invention. For example, the method of the invention may incorporate any of the features described with reference to the apparatus of the invention and vice versa.

So that the invention may be better understood, an embodiment will be described with reference to the following figures of which:—

Figure 1:
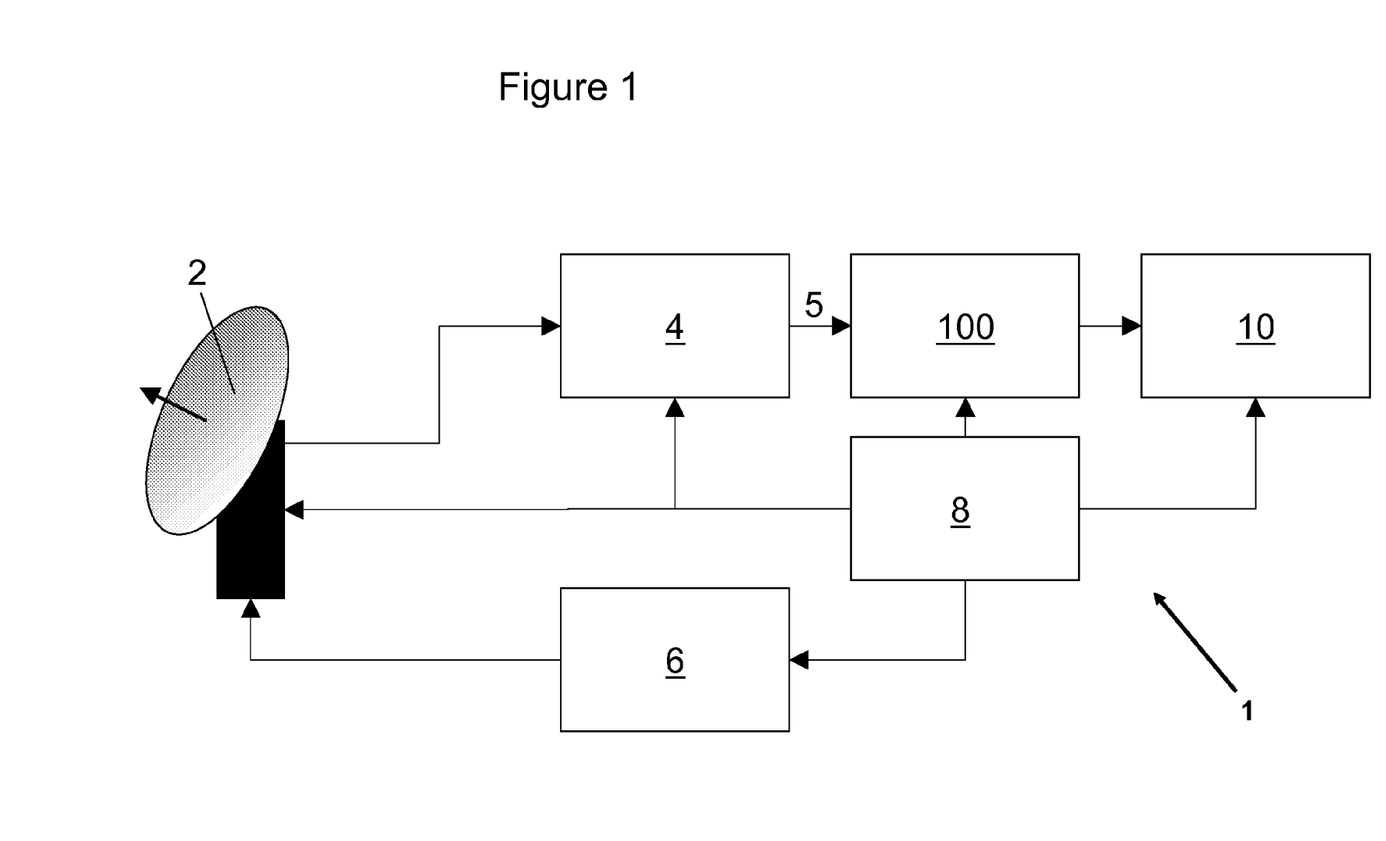
FIG. 1 shows a radar system.

A radar system 1, as shown in FIG. 1, comprises an antenna 2 in operable connection with a receiver 4 and a transmitter 6. The receiver 4 is additionally in operable connection with a signal processor 100. The signal processor 100 is additionally in operable connection with a display 10. Further, a control system 8 is in operable connection with each and every one of these components.

Figure 2:
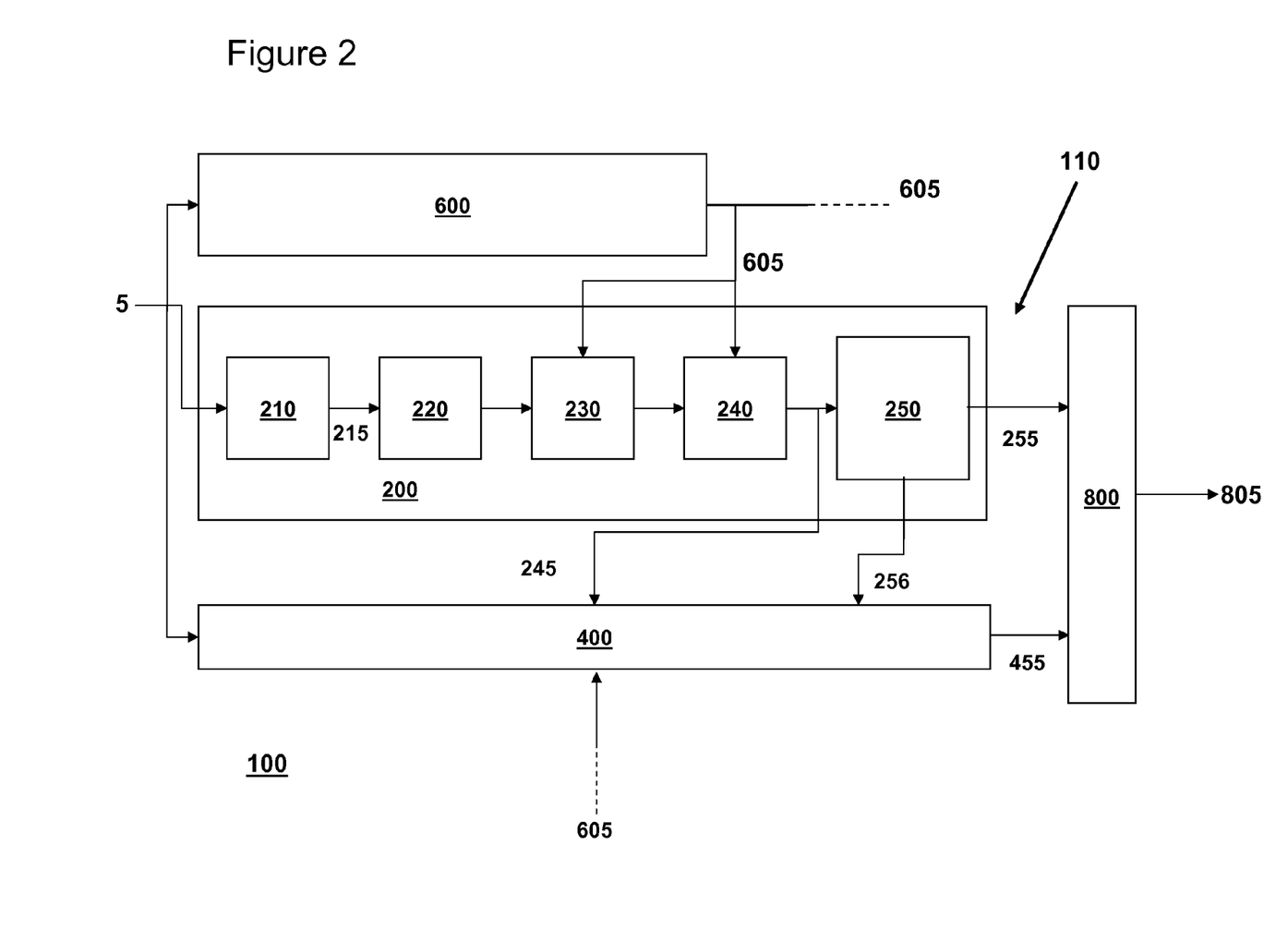
FIG. 2 shows a part of a signal processing system for use in a radar system such as is shown in FIG. 1, the shown signal processing system comprises a main MTI processor and an intermediate velocity MTI processor arranged in parallel.

As can be seen from FIG. 2, the signal processor 100 comprises a sensor 110. The sensor 110 comprises a first processing means, which may henceforth be referred to as a main MTI processor 200, a second processing means, which may henceforth be referred to as an intermediate velocity MTI processor 400, and an auxiliary functions unit 600. The signal processor 100 also comprises a post-detection processing unit 800.

The main MTI 200 processor comprises a chain of serially connected signal processors, each having a distinct function. The initial processor in the chain is a Narrow Notch MTI filter 210 arranged to receive an input signal 5. The output of Narrow Notch MTI Filter 210, that is to say the wide-band output 215, is input to a Take Log of Modulus processor 220. The output of Take Log of Modulus processor 220 is input to a Constant False Alarm Rate (CFAR) processor 230. The output of the CFAR processor 230 is input to an Integration processor 240 and the output 245 of the integration processor 240 is input to a MTI main channel Threshold Detection processor 250, which may henceforth be referred to as a threshold filter 250. The threshold filter 250 outputs a detection list signal 255 from the main MTI 200. The threshold filter 250 additionally outputs a detection threshold signal 256.

As further shown in FIG. 2, the intermediate velocity MTI 400 is arranged in parallel with the main MTI 200, and both the intermediate velocity MTI 400 and the main MTI 200 have the same input signal, signal 5. Signal 5 is replicated for input into multiple processors in a known way using, for example, a splitter (not shown).

Figure 3:
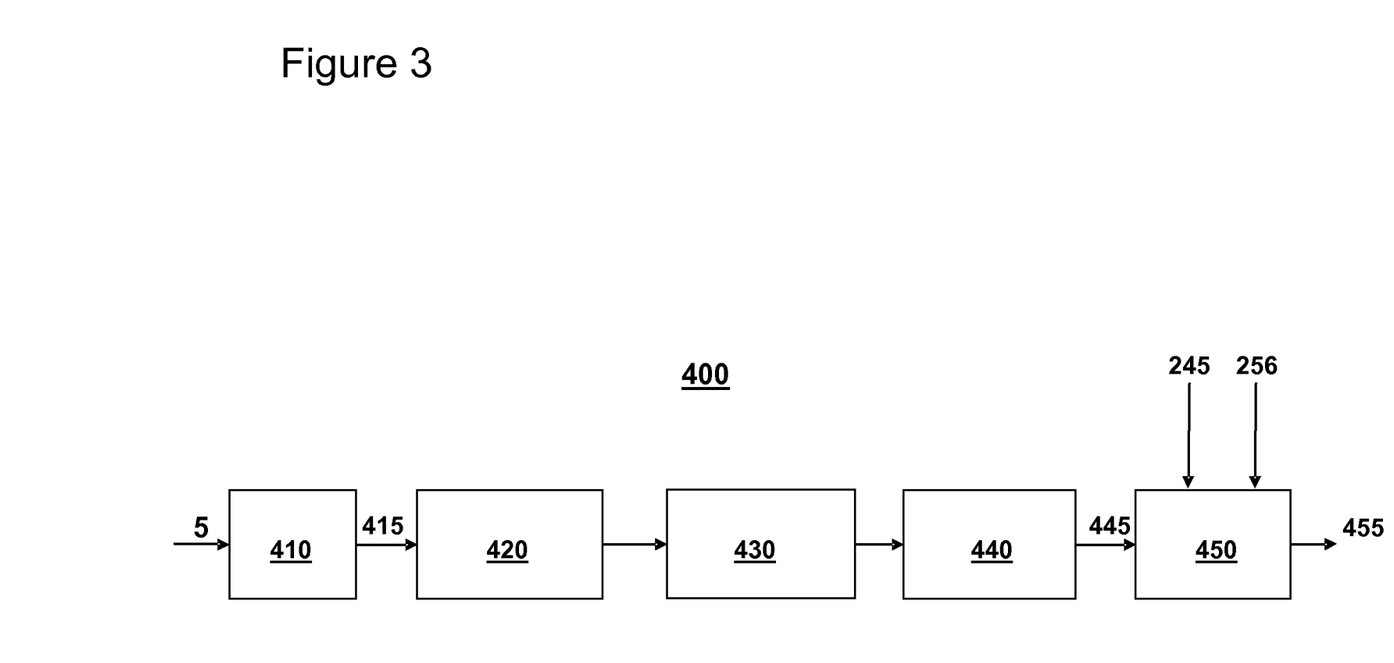
FIG. 3 shows a sub-chain in the signal processing system of FIG. 2, more specifically the sub-chain describes the intermediate velocity MTI processor which when used in parallel with a main MTI processor may identify signals likely to have been returned by birds.

As shown in FIG. 3, the intermediate velocity MTI 400 comprises a chain of serially connected signal processors, each having a distinct function. The initial processor in the chain is a Wide Notch MTI filter 410 and this filter is arranged to receive the input signal 5. The output of Wide Notch MTI Filter 410, that is to say the narrow-band output 415, is input to a Take Log of Modulus processor 420. The output of Take Log of Modulus processor 420 is input to a Constant False Alarm Rate (CFAR) processor 430. The output of the CFAR processor 430 is input to an Integration processor 440.

A comparator 450, which may henceforth be referred to as the Compare Bird and Main Channels (CBMC) processor 450, receives as an input not only an output 445 from the Integration processor 440 but also a Main MTI output signal 245, from the Integrator 240 within the main MTI 200. In addition, the CBMC 450 is operably connected to the threshold filter 250 and as such is able to receive the MTI target detection threshold signal 256. The CBMC processor 450 outputs a Potential Bird Flag signal 455.

As shown in FIG. 2, the Potential Bird Flag signal 455 is input to post-detection processing unit 800. Signal 255 is also input to post-detection processing unit 800.

The auxiliary functions unit 600 is operably connected to the main MTI 200 such that it may carry out known processing tasks. In particular, the auxiliary functions unit 600 interfaces with the CFAR processor 230 and Integrator processor 240 of the Main MTI 200 to identify and attenuate interference signals. Further, the auxiliary functions unit 600 interfaces with the CFAR processor 230 and Integrator processor 240 of the Main MTI 200 to identify range ambiguous targets and consequently suppress the associated signals.

The auxiliary functions unit 600 further interfaces with the CFAR processor 430 and Integrator processor 440 of the intermediate velocity MTI 400 in an equivalent manner to identify and attenuate interference signals and to suppress signals associated with range ambiguous targets.

The input signal 5 is a digital complex signal derived from the received signals occurring at the radar antenna 2 and associated with a particular range cell. The derivation of such a signal is known in the art and is common in modern radar systems.

In operation, input signal 5 is replicated at signal processor 100 and then processed in parallel by the main MTI processor 200 and the intermediate velocity MTI processor 400. Input signal 5 is also input to the Auxiliary Functions Unit 600.

Main MTI 200 and Intermediate Velocity MTI 400 have similar sub-chains of processors. In particular, each of the MT's 200 and 400 have a single Take Log of Modulus processor, 220 and 420 respectively, connected to a single CFAR processor, 230 and 430 respectively, connected to a single Integrator processor, 240 and 440 respectively. The role of these processors is to prevent false detections occurring as a result of background noise level changes (due to say a drift in the gain of the receiver 4, a change in receiver noise or external noise or clutter echoes).

However, a difference in function between the main MTI 200 and the intermediate velocity MTI 400 is to be found in the respective notch filters. Whereas narrow band notch filter 210 in the main MTI 200 is tuned to substantially attenuate signals returned from zero or near-zero velocity objects, the wide band notch filter 410 in the intermediate velocity MTI 400 is tuned to substantially attenuate signals returned from not only zero or near-zero velocity objects but also from intermediate velocity objects.

In particular, the intermediate velocity MTI 400 is tuned to substantially attenuate signals returned from objects travelling below a specific threshold velocity $x_2$ which defines the upper limit of the intermediate velocity range.

In the present embodiment, the Intermediate Velocity MTI 400 is tuned to identify and distinguish avian clutter (returns from birds) from other signals. Thus the threshold velocity $x_2$ is chosen as 25 m/s, the maximum likely velocity of a bird accounting for typical wind speeds.

Figure 4:
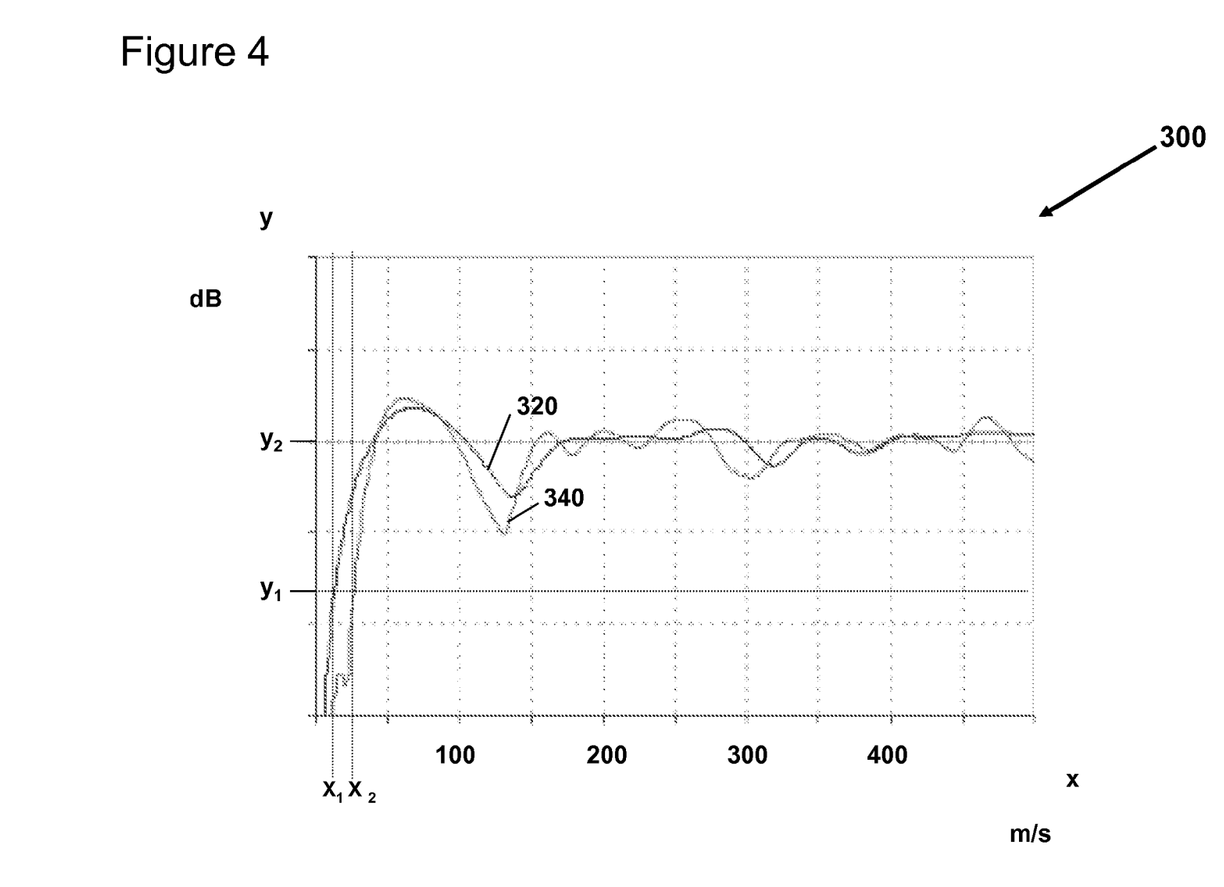
FIG. 4 is a graph comparing the velocity response of an intermediate MTI processor as shown in FIG. 3 with the velocity response of the main MTI processor shown in FIG. 2. The y-axis represents filter gain (dB) and the x-axis represents target velocity in meters per second.

The differences in output characteristics, between the narrow notch filter 210 and the wide notch filter 410, are shown by the graph 300 of FIG. 4. Plots 320 and 340 show the velocity response of the filters, that is to say they represent how the factor by which the input signal 5 is scaled varies with the velocity of the object from which the input signal 5 was derived. Plot 320 represents the response of the narrow notch filter 210. Plot 340 represents the response of the wide notch filter 410.

As can be seen for both velocity responses, the output of the filter tends towards a gain of $y=y_2$ as the velocity of the target increases and thus signals derived from objects with high velocity will not to be substantially attenuated. However substantial attenuation tends to occur where signals are derived from objects moving at lower velocities. Substantial attenuation is defined as occurring if the signal gain is less than or equal to $y_1$. In the present embodiment $y_1+3$ dB=$y_2$ and so the point on the x-axis at which the velocity response crosses $y=y_1$ corresponds to the one-sided bandwidth.

For the narrow notch filter 210, signals returned from objects travelling below velocity $x_1$ will be attenuated to a strength less than $y=y_1$. To achieve this, the narrow notch filter 210 is tuned to have a one-sided bandwidth at the frequency corresponding to $x_1$, the maximum near-zero velocity. The value chosen as the maximum near-zero velocity depends on the radar pulse repetition frequency and the radio frequency used and typically will be no more than about 10 m/s.

Signals of magnitude less than $y_1$ can be discarded in the main MTI 200. Thus attenuated signals do not get transferred to the post detection processing unit 800.

For the wide notch filter 410, and in contrast to the main MTI 200, signals returned from objects travelling with a velocity less than the threshold velocity $x_2$, where $x_2 > x_1$, will be attenuated to a strength less than $y=y_1$.

$x_2$ is specified as the maximum likely velocity of the intermediate velocity object and may be referred to as the threshold velocity. Objects with a velocity less than $x_2$ are distinctly attenuated by the wide-band notch filter 410. It can be appreciated that, an object travelling at a velocity below $x_2$ will give a substantially different output from the wide notch filter 410 in comparison to the output that same object gives from narrow notch filter 210.

$y_1$ is used to derive the detection threshold applied in the threshold filter 250 of the main MTI 200. Thus signals with a gain below $y_1$ are identified as being from zero or near-zero velocity objects (which are assumed to be clutter) and so are not present in the detection list signal 255.

$y_1$ is communicated to the CBMC processor 450 within the detection threshold signal 256.

At the CBMC processor 450, the output 245 from the main MTI 200 is compared to the output 445 from the intermediate velocity MTI 400. Outputs 245 and 445 are derived respectively from the output of the filters 210 and 410 by means of equivalent processing operations. Such processing operations are undertaken by the units that are present in both of the main MTI 200 and the intermediate velocity MTI 400 (i.e. the Take Log of Modulus processors, the CFAR processors and the integrator processors). Thus distinctions between the outputs 215 and 415 will be consistently preserved in outputs 245 and 445 respectively.

Additionally, each of the outputs 245 and 445 are compared to the detection threshold $y_1$.

The CBMC processor 450 may output a flag signal 455 associated with a particular range cell and by doing so indicate the presence of an intermediate velocity object to the detection processing unit 800. Flag signal 455 is output if one or both of the following criteria are met:—
 i) The ratio between the output 245 of the main MTI and the output 445 of the intermediate velocity MTI is greater than a ratio threshold;
 ii) The output 445 of the intermediate velocity MTI 400 is less than the MTI target detection threshold $y_1$ AND the output 245 of the output of the main MTI 200 is greater than the MTI target detection threshold $y_1$. Given the characteristic filter responses shown in FIG. 4 therefore, this criteria will be satisfied when the velocity of the object is in the range between $x_1$ and $x_2$.

Considering FIG. 4, criteria i) can be understood because at velocities above $x_2$, the gain of the velocity responses are increasing and are also tending to converge and so the ratio will decrease.

Considering FIG. 4 again, criteria ii) can be understood because only in the region between $x_1$ and $x_2$, does the main MTI velocity response have a gain greater than $y_1$, and the intermediate velocity MTI have a gain less than $y_1$.

The flag signal 455 is input to the detection processing unit 800. Hence the radar system can decide upon an appropriate action to take regarding the processing of signal 255.

In the present embodiment, the system is calibrated so that the velocity range $x_1$ to $x_2$ covers the returns from objects travelling at velocities consistent with the likely velocities of birds, in particular 10 m/s to 25 m/s (this corresponds to one-sided bandpass frequencies of 87 Hz in the narrow notch filter and 217 Hz in the wide notch filter at L band (1.3 GHz RF), 200 and 500 Hz at S band (3 GHz RF), 367 and 917 Hz at C band (5.5 GHz RF), 634 and 1584 Hz at X band (9.5 GHz RF).

Upon detection of returns in this velocity band, the radar system would determine that the returns were from birds and as such should not be tracked. The radar system would then inhibit the tracking of returns from the range cell which the birds occupy. Thus the radar resource tends to be preserved for scanning or tracking targets.

In particular, signals identified as being derived from bird returns will not be output from the Post Detection Processing unit 800 as a partial plot 805. A partial plot is a "message" associated with each detection. Typically the partial plot contains: an indication that a target has been detected, the measurement parameters associated with the target (such as range and angle, as calculated within the Post Detection Processing unit 800) and the potential bird flag 455.

Whilst the present embodiment has described a method for detecting birds, it can be appreciated that any intermediate velocity object could be detected using the method of the invention.

Further, the maximum velocity $x_2$ defining the upper limit of what does or does not represent an intermediate velocity object may be a dynamic quantity. In such case the choice of different coefficients in the wide notch MTI filter 410 can be used to vary $x_2$.

In further variants of the invention, the main MTI and the Intermediate Velocity MTI may be provided with equivalent signal processing components in addition to, or instead of, the Take Log of Modulus, CFAR and Integrator processors.

The signal processor 100 may be implemented on a microprocessor or alternatively on a plurality of microprocessors and in both cases, the implementation itself could be done in a manner that would be well known in the art.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may be absent in other embodiments.

The invention claimed is:

1. A sensor for detecting whether a received signal has been returned either
 from an object moving at or above a threshold velocity or
 from an object moving at a lesser velocity, the sensor comprising:
 a) a first processing means comprising a narrow-band notch filter, the processing means being configured to receive an input signal derived from the received signal and generate a wide-band output;
 b) a second processing means comprising a wide-band notch filter, the processing means being configured to receive the input signal and generate a narrow-band output;
 c) a comparator configured to receive:
  i) the narrow-band output and
  ii) the wide-band output
 such that the comparator generates a flag signal for indicating the presence of an object moving at a lesser velocity if the narrow-band output is determined to be less than the wide-band output.

2. A sensor according to claim 1 wherein the sensor additionally comprises a thresholding filter in operable connection with the narrow notch filter and suitable for operable connection with a post detection processing means, the thresholding filter setting a detection threshold such that the output derived from the narrow-band notch filter is discarded if the magnitude of the output derived from the narrow-band notch filter is below the detection threshold.

3. A sensor according to claim 2 wherein the comparator is operably connected to the thresholding filter, and wherein the comparator determines that the narrow-band output is less than the wide-band output if:

(i) the narrow-band output is less than the detection threshold, and the wide-band output is greater than the detection threshold.

4. A sensor according to claim 1 wherein the comparator determines that the output derived from the wide-band notch filter is determined to be less than the output derived from narrow-band notch filter if:
   (ii) the wide-band output divided by the narrow-band output exceeds a threshold ratio.

5. A sensor according to claim 1 wherein the narrow-band notch filter has a one-sided bandwidth that is less than the frequency of the signal corresponding to the threshold velocity
   and
   the wide-band notch filter has a one-sided bandwidth greater than or equal to the frequency of the signal corresponding to the threshold velocity.

6. A sensor according to claim 1 wherein the narrow-band notch filter is tuned for filtering out signals corresponding to zero or near zero velocity objects and the wide-band notch filter is tuned for filtering out signals from objects with velocities less than 25 m/s.

7. A sensor according to claim 1 wherein the first processing means further comprises a Take Log of Modulus processing means
   and the second processing means further comprises a Take Log of Modulus processing means
   such that a signal is equivalently manipulated by each Take Log of Modulus processing means.

8. A sensor according to claim 1 wherein the first processing means further comprises a CFAR processing means
   and the second processing means further comprises a CFAR processing means
   such that a signal is equivalently manipulated by each CFAR processing means.

9. A sensor according to claim 1 wherein the first processing means further comprises a non-coherent integrator processing means
   and the second processing means further comprises a non-coherent integrator processing means
   such that a signal is equivalently manipulated by each non-coherent integrator processing means.

10. A sensor according to claim 1 adapted to receive and process a received signal comprising a plurality of coherent pulses.

11. A method for determining whether a received signal has been returned either
    from a target moving at or above a threshold velocity, or
    from an object moving at a lesser velocity,
    the method being for use in a radar system and comprising the steps of:
    using a first processing means to filter an input signal derived from a received signal, using a narrow-band notch filter, to obtain a wide-band output,
    using a second processing means to filter the input signal, using a wide-band notch filter, to obtain a narrow-band output
    using a comparator to compare the wide-band output to the narrow-band output such that if the narrow-band output is determined to be less than the wide-band output, a flag signal is generated to indicate that the received signal is from an object moving at a lesser velocity.

12. A radar system for detecting whether a received signal has been returned either
    from a target moving at or above a threshold velocity or
    from an object moving at a lesser velocity, the radar system comprising a sensor according to any one of claims 1 to 9, and further comprising a post detection processing means operably connected to the sensor.

13. A radar system according to 12 wherein the radar system associates the flag signal with a particular range cell within a volume under surveillance.

14. A radar system according to claim 13 wherein if the sensor inputs a null flag signal to the post detection processing means, then the post detection processing means outputs a signal permitting the radar system to track the target identified in the associated range cell
    and
    if the sensor outputs a flag signal to the post detection processing unit, the post detection processing unit outputs a signal inhibiting the radar system from tracking the object identified in the associated range cell.

15. A radar system according to claim 14 wherein the inhibiting of the radar system from tracking the object identified in the associated range cell varies with the contemporaneous availability of a processing power in the radar system.

* * * * *